United States Patent [19]

Carlson

[11] 4,428,180
[45] Jan. 31, 1984

[54] LAWN MOWER AND CONTROLS THEREFOR

[75] Inventor: John A. Carlson, Conroe, Tex.

[73] Assignee: Capro, Inc., Houston, Tex.

[21] Appl. No.: 379,764

[22] Filed: May 19, 1982

Related U.S. Application Data

[63] Continuation-in-part of Ser. No. 230,607, Feb. 2, 1981, which is a continuation-in-part of Ser. No. 157,374, Jun. 9, 1980, Pat. No. 4,309,862.

[51] Int. Cl.³ ............................................. A01D 69/10
[52] U.S. Cl. ..................... 56/11.3; 56/10.5; 56/10.8; 180/19 H
[58] Field of Search ............. 56/10.2, 10.5, 10.8, 56/11.2, 11.3, 11.8; 192/0.072, 0.094; 180/19 H

[56] References Cited

U.S. PATENT DOCUMENTS

| | | | |
|---|---|---|---|
| 4,044,533 | 8/1977 | Wick | 56/10.5 |
| 4,117,651 | 10/1978 | Martin | 192/0.094 |
| 4,158,944 | 6/1979 | Rabinow | 56/11.3 |
| 4,167,221 | 9/1979 | Edmonson et al. | 56/10.2 |
| 4,205,737 | 6/1980 | Harkness et al. | 56/11.3 |
| 4,209,964 | 7/1980 | Fuelling, Jr. et al. | 56/11.2 |
| 4,221,108 | 9/1980 | Owens | 56/10.5 |
| 4,281,732 | 8/1981 | Hoch | 56/11.8 |
| 4,309,862 | 1/1982 | Carlson | 56/10.5 |
| 4,327,539 | 5/1982 | Bricko et al. | 56/10.8 |
| 4,335,566 | 6/1982 | Hurd | 56/11.8 |
| 4,362,228 | 12/1982 | Plamper et al. | 192/0.094 |
| 4,363,206 | 12/1982 | Schmitt | 56/11.8 |

Primary Examiner—Gene Mancene
Assistant Examiner—Kris R. Schulze
Attorney, Agent, or Firm—Vinson & Elkins

[57] ABSTRACT

A lawn mower having a housing mounted on wheels, an engine, a cutting blade, a brake connected to stop the cutting blade's rotation, a brake actuating arm connected to the brake, a spring biasing the brake arm to the set or braking position, a U-shaped handle connected to the housing and extending upward and rearward with a cross portion at its outer end, an actuating arm on the engine, a control housing secured to the side of the handle, a spring biasing the actuating arm toward stopped position, a control line connected to actuating arm extending through a sheath to a control lever in the control housing, a deadman lever in the control housing, the control lever and the deadman levers being interconnected so that the deadman lever retains the control lever in running position while the deadman lever is held in operating position but the control lever is released to stop position when the deadman lever is released.

17 Claims, 17 Drawing Figures

LAWN MOWER AND CONTROLS THEREFOR

CROSS REFERENCE TO RELATED APPLICATION

This application is a continuation-in-part of my prior copending application Ser. No. 230,607, filed Feb. 2, 1981, which was a copending continuation-in-part application of my prior application Ser. No. 157,375, filed June 9, 1980, now U.S. Pat. No. 4,309,862.

BACKGROUND

Power lawn mowers using gasoline engines, even those having some clutch connection between the drive shaft and the cutting blade, are dangerous because the blade continues to rotate at high speed when the operator lets go of the handle. Some mowers have a clutch plate engaging the blade to allow it to stop rotating if it hits a solid object. This does not protect against hands and feet being severly cut by the blade. Also, with some of these clutches there is no provision to cause the engine to slow when the blade stops turning.

SUMMARY

The present invention relates to an improved power lawn mower and an improved dual lever control system is provided in which the brake and motor are controlled by a control lever which applies the brake and stops the motor when released and a deadman lever which holds the control lever in operating position so long as the deadman lever is held and holds the control lever in stop position when both levers are released. Another form guards the control lever in stopped position but does not lock it in such position. Also, provision is made for variations in the amount of travel of the control cable without changing the amount of angular movement of the control lever.

An object of the present invention is to provide an improved power lawn mower which is safer to use in that inadvertent rotation of the blade is prevented.

Still another object is to provide an improved lawn mower control system which shuts off the motor and applies the brake to the blade when the control levers are released by the operator.

A still further object is to provide a safe lawn mower control system which may be both started and stopped by the operator at the handle position.

Still another object is to provide an improved lawn mower control system for operation of a mower to alternately engage the clutch and release the brake and disengage the clutch and apply the brake without changing the throttle setting so that the blade stops when not in use.

BRIEF DESCRIPTION OF THE DRAWINGS

These and other objects and advantages of the present invention are hereinafter set forth and explained with reference to the drawings wherein.

DESCRIPTION OF THE PREFERRED EMBODIMENT

Figure 1:
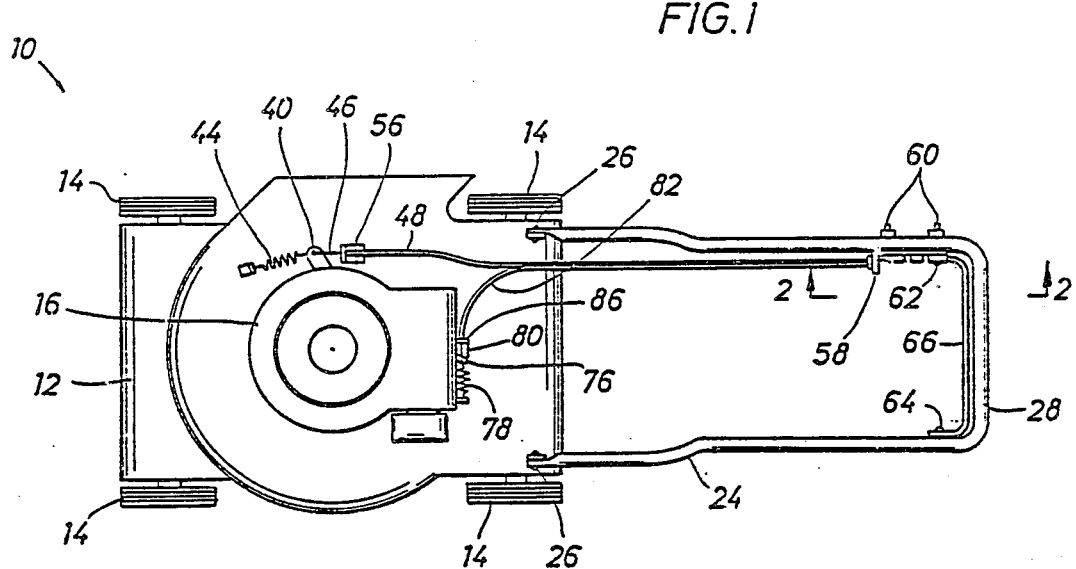
FIG. 1 is a plan view of the improved lawn mower of the present invention.

Lawn mower 10 as shown in FIG. 1 includes housing 12, wheels 14 mounted thereon to allow housing 12 to be rolled on the lawn to be cut, engine 16 mounted on housing 12, cutting blade 18 connected to drive shaft 20 of engine 16 by clutch assembly 22. Mower 10 is pushed and directed by U-shaped handle 24 which is connected to housing 12 by suitable means, such as bolts 26. Handle 24 extends upward and rearward from housing 12 in the usual manner and has cross portion 28 which is grasped by the operator to push and steer.

Figure 2:
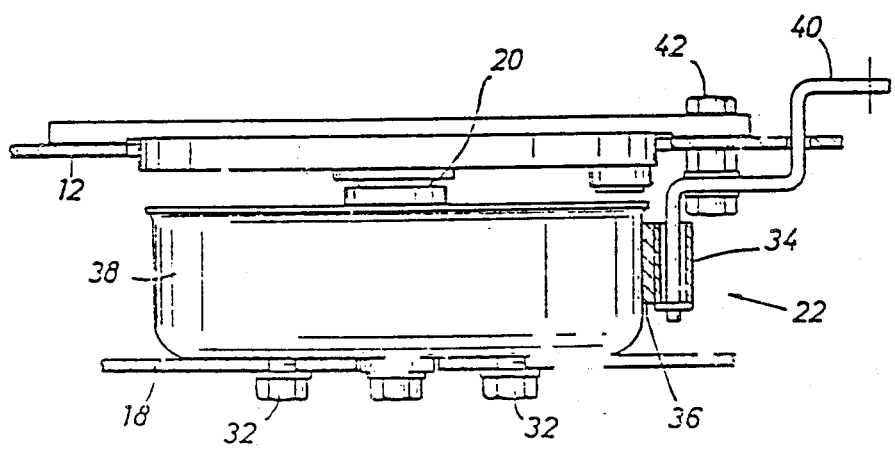
FIG. 2 is a sectional view illustrating the clutch assembly connecting from the engine drive shaft to the cutting blade and the brake assembly.

As best seen in FIG. 2, clutch assembly 22 which is a centrifugal clutch, is suitably keyed to drive shaft 20 and cutting blade 18 is secured to clutch assembly 22 by bolts 32. Brake assembly or brake 34 includes brake band 36 which is tightened about clutch housing 38 by movement of brake actuating arm 40 about its pivot pin 42. When the brake is applied, the rotation of cutting blade 18 is stopped. With a centrifugal clutch, such as shown, it is desired that when clutch housing 38 is stopped the rotation of drive shaft 20 be slowed to prevent slipping of clutch assembly 22. Arm 40 is biased by spring 44 to the brake set or braking position.

Brake control line or cable 46 is connected to arm 40, extends through conduit or sheath 48 and connects to a control system lever, as hereinafter described, which is mounted near the rear of handle 24. Sheath 48 is secured to housing 12 by angle bracket 56 and is secured to flange 58 of control housing or plate 54. Control housing or plate 54 is secured to the inside of handle 24 by bolts 60 as shown.

Throttle actuating arm 76 connects to engine 16 and controls its speed. Spring 78 biases arm 76 toward the idle and shutoff positions and with no other forces on arm 76 is sufficiently strong to move arm 76 to the shutoff position. Throttle control line or cable 80 connects to arm 76, extends through sheath or conduit 82 and connects to a suitable throttle lever (not shown). Sheath 82 is secured by angle bracket 86 to housing 12.

Figure 3:
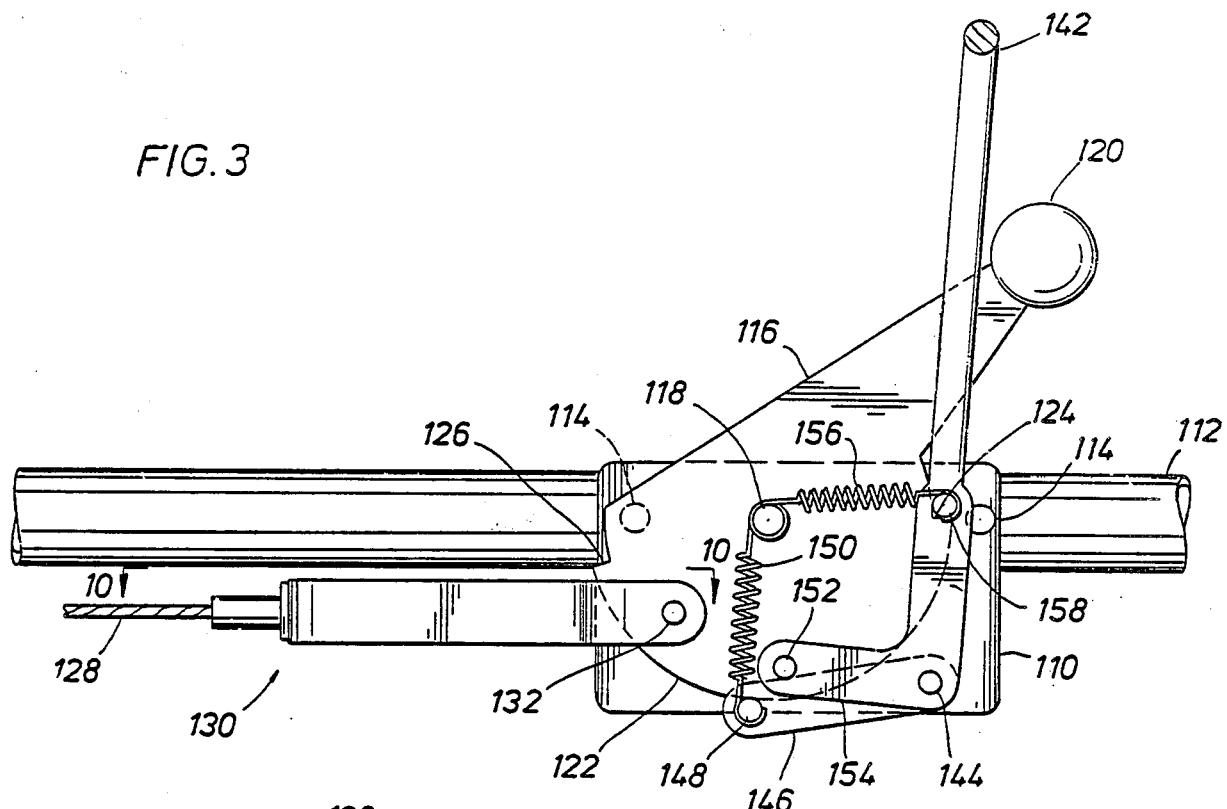
FIG. 3 is an elevation view of one form of lawn mower control system in relaxed condition, i.e., brake applied.
Figure 4:
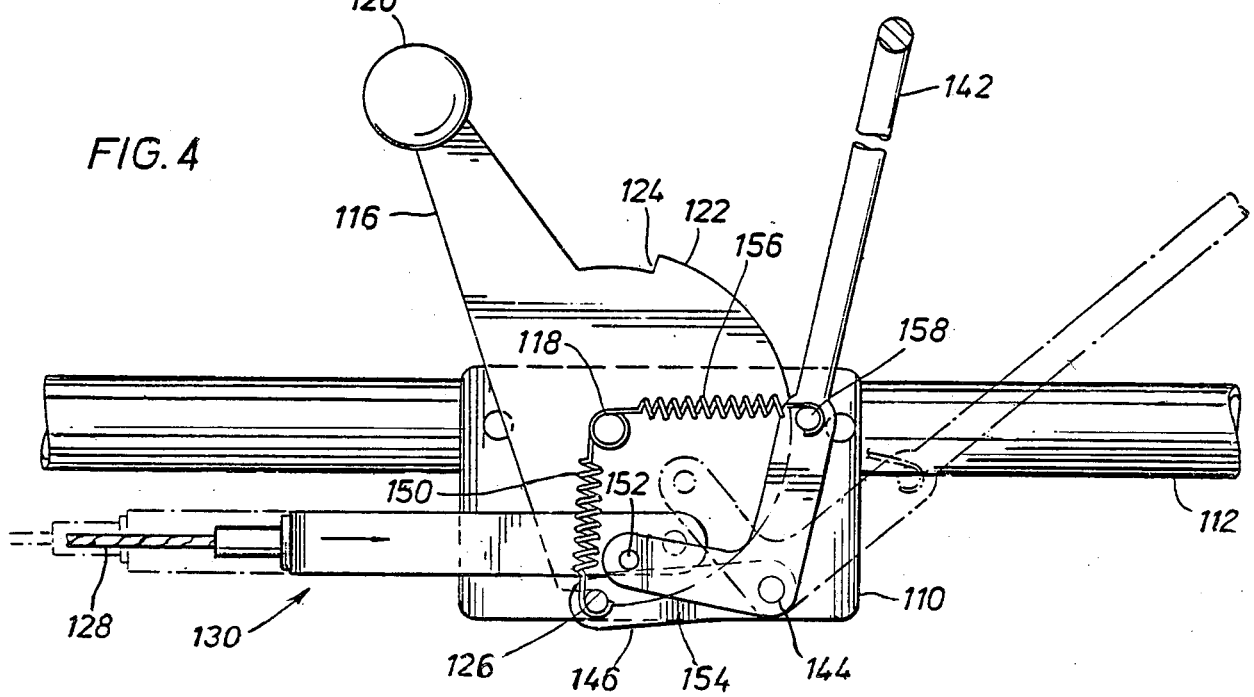
FIG. 4 is another view of the control system shown in FIG. 3 in operating position.
Figure 5:
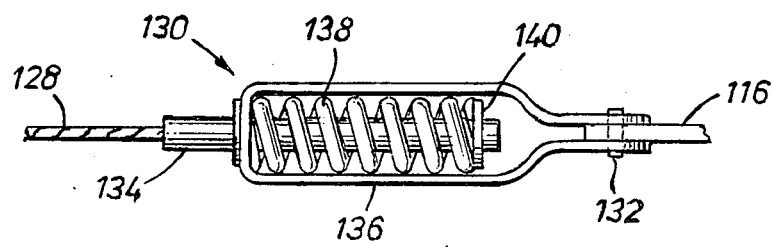
FIG. 5 is a sectional view of the control cable tensioning device.

The modified control system illustrated in FIGS. 3 and 4 is mounted on plate 110 which is suitably secured to handle 112, as by bolts 114. Control lever 116 is pivotally mounted to plate 110 by pin 118. Control lever 116 includes operating handle 120 and arcuate edge 122 extending from shoulder 124 to shoulder 126. Control line or cable 128 is connected to tensioning means 130 which is connected by pin 132 to control lever 116. As shown, counterclockwise movement of lever 116 (from FIG. 3 position to FIG. 4 position) moves control cable 128 from relaxed position with the clutch disengaged and the brake engaged to running position with the clutch engaged and brake released. Tensioning means 130 is shown in FIG. 5 and includes rod 134 clamped on the end of cable 128 and extending through the end of clevis 136 with spring 138 surrounding rod 134 and engaged between washer 140, which is secured on the end of rod 134, and the interior of clevis 136. Tensioning means 130 and cable 128 are adjusted on being connected to lever 116 to provide the desired amount of pretension in cable 128.

Bail or deadman lever 142 is generally "L" shaped and is pivotally mounted to plate 110 by pin 144. Link 146 is also pivotally mounted to plate 110 by pin 144 and includes pin 148 extending through the other end of link 146. Pin 148 on one side of link 146 rides on edge 122 of lever 116 and in running position engages shoulder 126 as shown in FIG. 4. Spring 150 surrounds pin 148 on the other side of link 146 and connects to pin 118 to bias link 146 toward engagement with surface 122 of lever 116. Pin 152 extends through the outer end of the foot portion 154 of lever 142 and engages the upper side of link 146 as shown in FIG. 3. Spring 156 extends from pin 118 to pin 158 in lever 142 to bias lever 142 in a counterclockwise direction. Spring 156 has sufficient force to rotate lever 142 when it is released and to force link 146 downward, by engagement of pin 152 thereon, and out of engagement with shoulder 126 so that control lever 116 is released and returns to the position shown in FIG. 3.

In operation, control lever 116 is held in released or relaxed position, as shown in FIG. 3, by the engagement of pin 158 which extends through bail 142 with shoulder 124 on lever 116. Movement of bail 142 to the rear as shown in dashed lines in FIG. 4 allows lever 116 to be moved forward by the operator causing control cable 128 to be pulled to release the brake and engage the clutch.

Figure 6:
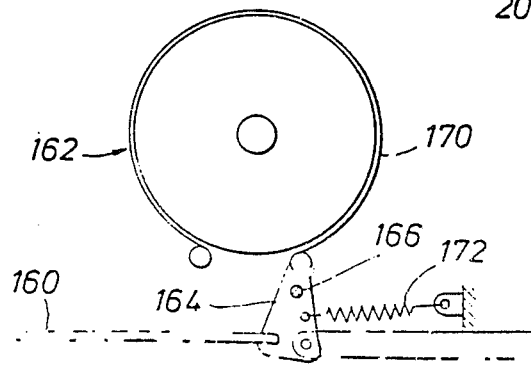
FIG. 6 is a schematic view of the operation of a brake and motor start and shut off by the control cable.
Figure 6:
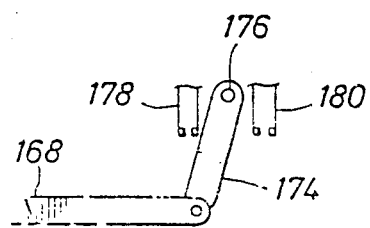

A modified structure for lawn mower controls is shown schematically in FIG. 6 wherein a single control cable 160 is used for electric starting, electric stopping, running, and for applying and releasing brake 162. Cable 160 is connected to link 164 which is pivotally mounted to the engine (not shown) by pin 166. Cable 160 and starter linkage 168 are connected to one end of link and the other end of link 164 is suitably connected to brake band 170 of brake 162. Spring 172 is connected to link 164 to bias it in a counter clockwise direction about pin 166. Starter linkage 168 is connected to arm 174 which is pivotally mounted about pin 176. When cable 160 and starter linkage 168 are pulled to the left in FIG. 6, starter contacts 178 are closed by arm 174. When cables 160 and linkage 168 are released and move to the right, arm 174 closes grounding contacts 180 to stop the engine. As shown in FIG. 6, arm 174 is in the position of normal engine running. To start the engine, cable 160 is pulled to the left to close contacts 178 and then returned to running position. Release of the control lever (not shown in FIG. 6) allows cable 160 and linkage 168 to move to the right by virtue of the force exerted by spring 172 which rotates link 164 clockwise applying brake 162 and closing contacts 180 to ground the engine ignition. Thus, the operator can start and stop the engine from the mower handle and the engine will not run unless the control levers are held in running position.

Figure 7:
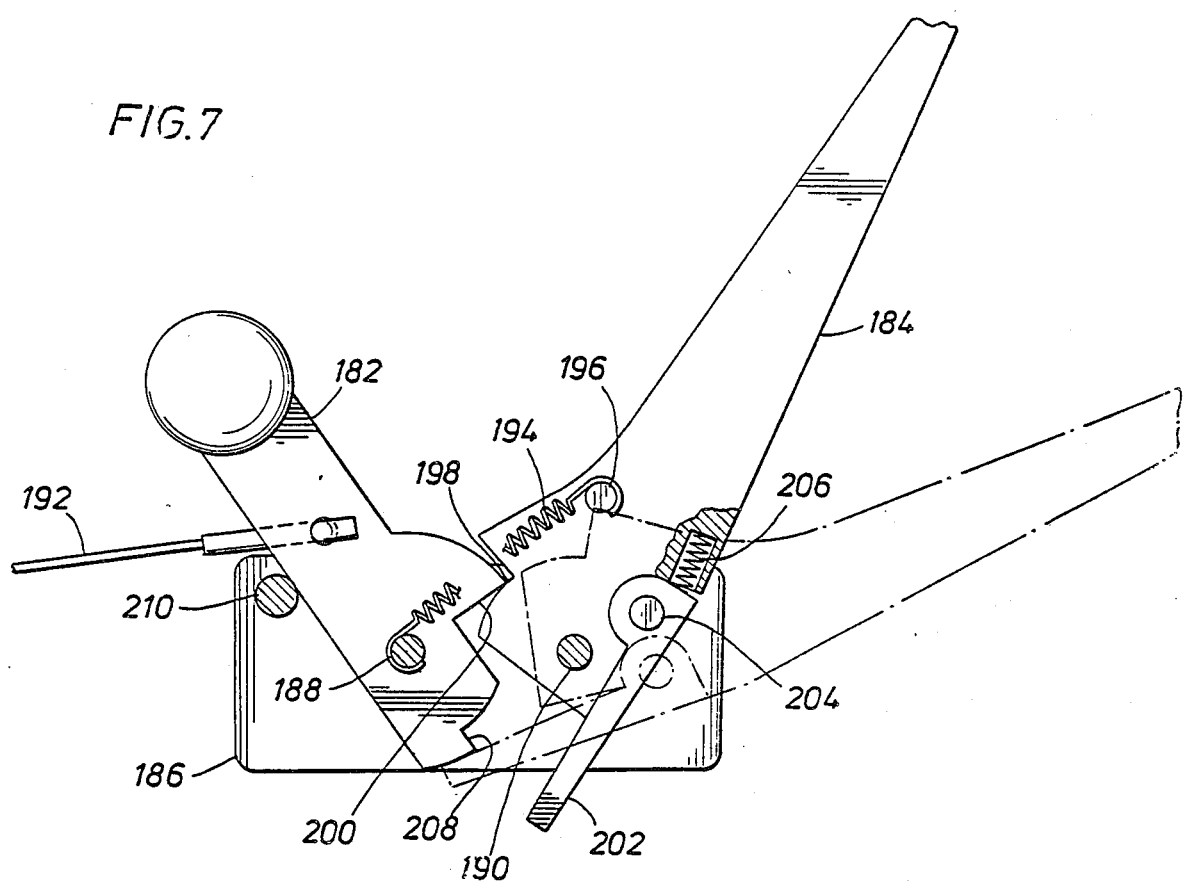
FIG. 7 is an elevation view of the control system for electric starting of a lawn mower motor in relaxed or shutoff position.
Figure 8:
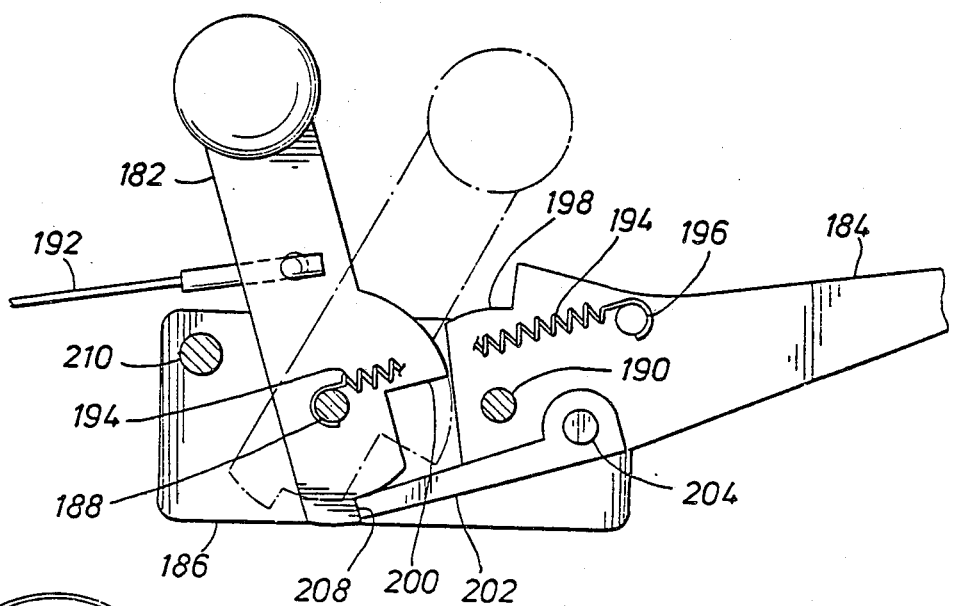
FIG. 8 is a view similar to FIG. 7 showing such control system with the controls in start and run positions.

A modified control system is shown in FIGS. 7 and 8. Control lever 182 and deadman lever 184 are pivotally connected to mounting plate 186 by pins 188 and 190, respectively. Control cable 192, which normally controls the brake, stopping and starting as previously described with respect to FIG. 6, is connected to control lever 182. Spring 194 is connected between pin 188 and pin 196 in lever 184 to bias lever 184 in the counterclockwise direction which is the engine shutoff or stop position of cable 192. Lever 184 includes shoulder 198 which engages under shoulder 200 on lever 182 in stop position as shown in FIG. 7 and finger 202 which is pivotally mounted to lever 184 by pin 204 and is biased in a clockwise direction about pin 204 by spring 206. The end of finger 202 is adapted to engage shoulder 208 on lever 182 to retain lever 182 in running position so long as lever 184 is held in its rearward or running position (shown in dashed lines in FIG. 7 and solid lines in FIG. 8).

To operate the lawn mower having the control system shown in FIGS. 7 and 8 the operator moves lever 184 to the rear as shown by dashed lines in FIG. 7. This removes shoulder 198 out of engagement with shoulder 200. Finger 202, being pivotally mounted to lever 184, engages lever 182 below shoulder 208 but does not prevent further movement of lever 184 to remove shoulder 198 from possible engagement with shoulder 200. Lever 182 is then moved to its rearmost position (shown in dashed lines in FIG. 8) to start the engine. After the engine starts, lever 182 is released and returns to running position (shown in solid lines in FIG. 8) where it is held from moving to its stop position by engagement of finger 202 with shoulder 208. Release of lever 184 allows spring 198 to move lever 184 to its relaxed or stopped position and disengages finger 202 from shoulder 208 which allows lever 182 to be moved by the cable spring (not shown) to its stop position against stop pin 210.

Figure 9:
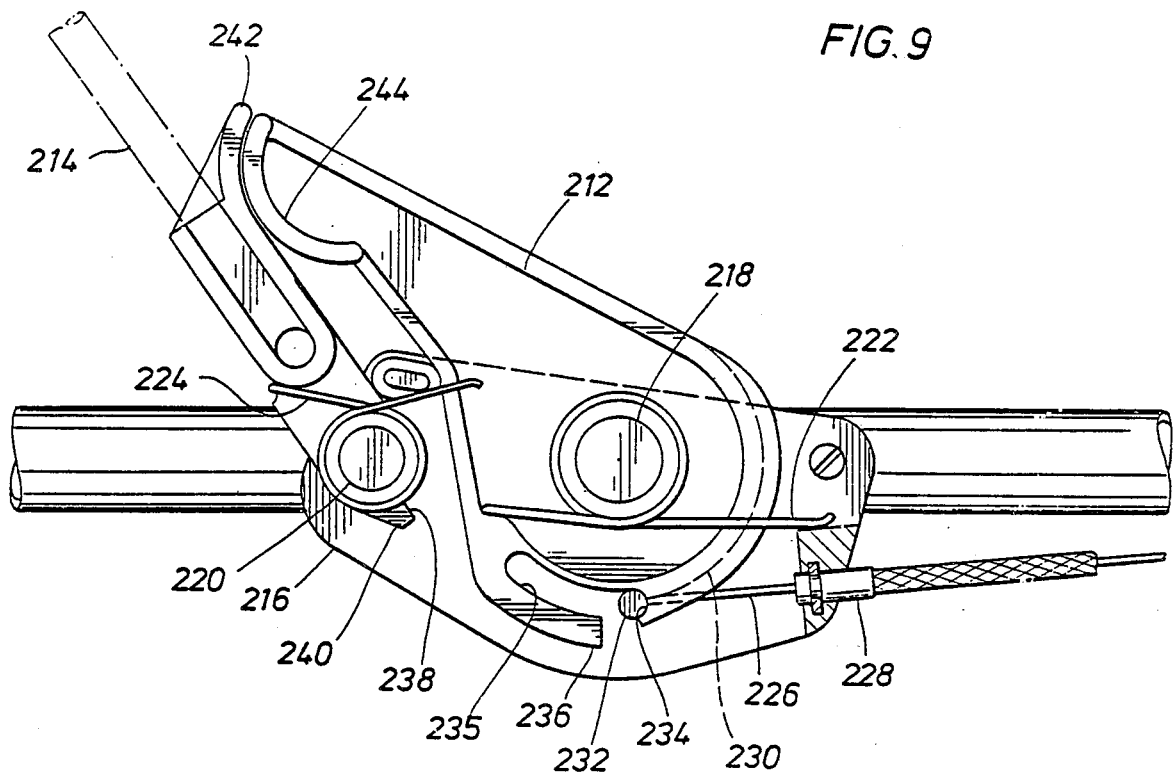
FIG. 9 is an elevation view of another modified form of control system with the controls in relaxed position.
Figure 10:
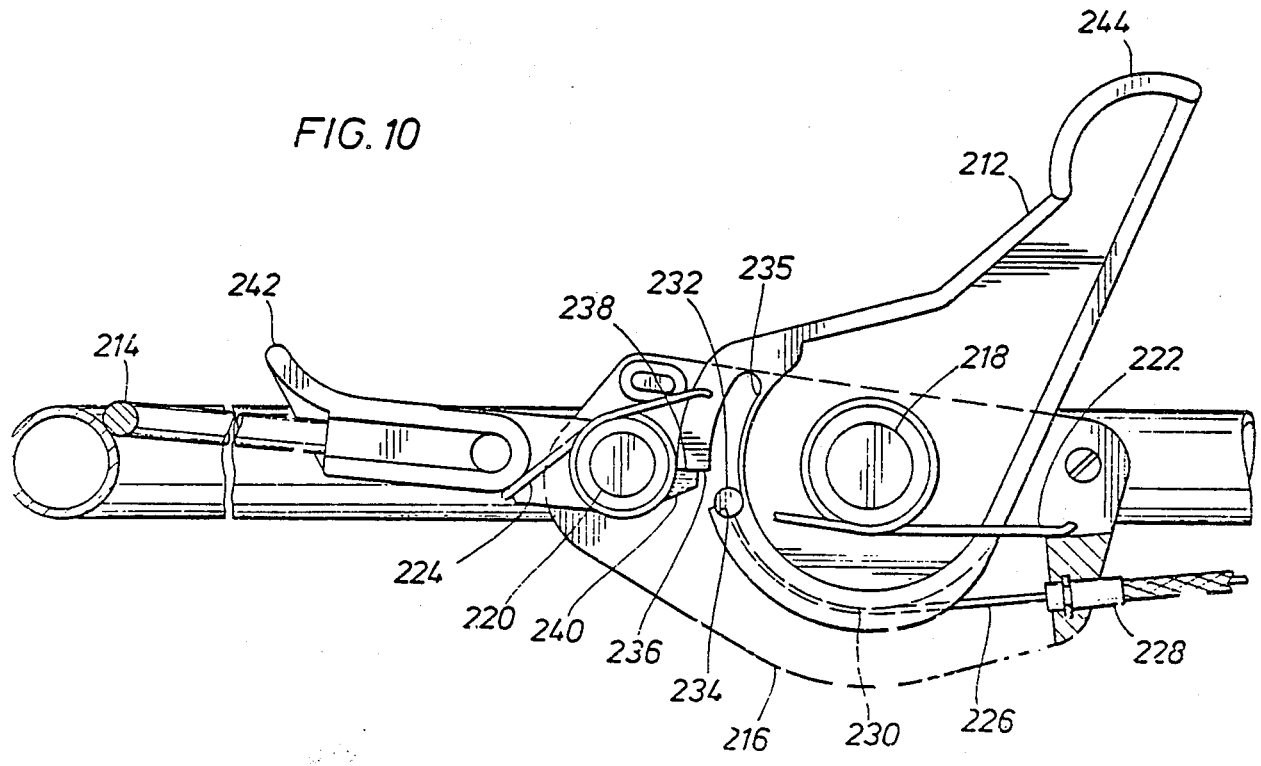
FIG. 10 is a view similar to FIG. 9 showing such controls in running position.

Another modified form of control system is shown in FIGS. 9 and 10. Control lever 212 and deadman lever 214 are pivotally mounted to plate 216 by pins 218 and 220, respectively. Spring 222 biases control lever 212 in the counterclockwise direction or toward the blade stopped position shown in FIG. 9. Spring 224 biases deadman lever 214 in the clockwise direction or toward its position protecting control lever 212 from inadvertent movement forward. Control cable 226 extends through tube 228 mounted on plate 216 and through a portion of arcuate groove 230 on the lower edge of control lever 212 and is secured to control lever 212 by pin 232 on the end of cable 226 being in recess 234. Slot 235 in control lever 212 is opposite recess 234 and receives pin 232 when the movement of lever 212 is greater than the movement of cable 226 for stopping blade rotation. This position is shown in FIG. 9 in dashed lines. Control lever 212 includes flexible latch finger 236 below slot 235 which is adapted to engage shoulder 238 on deadman lever 214 to hold control lever 212 in running position shown in FIG. 10. Finger 236 is flexible to allow control lever 212 to be moved to running position by engaging surface 240 and sliding thereby with an inward flexing of finger 236.

Deadman lever 214 includes curved plate 242 positioned to receive and protect handle 244 of control lever 212 when the levers are in stopped position as shown in FIG. 9. Thus, lever 214 is normally moved before control lever 212 so that the operator will be behind the handle before the cutting blade starts to rotate.

Figure 11:
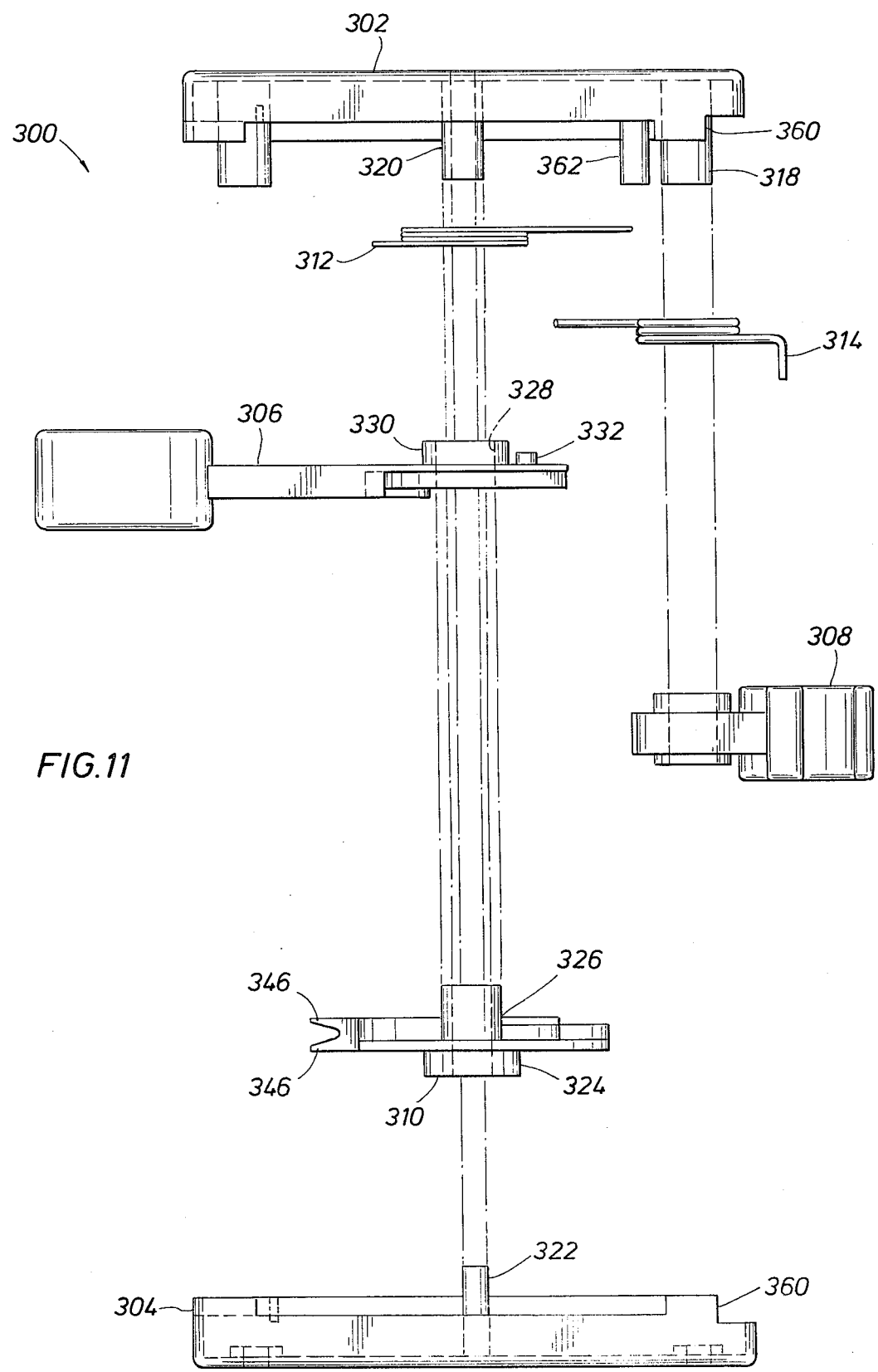
FIG. 11 is an exploded plan view of a modified control system.
Figure 12:
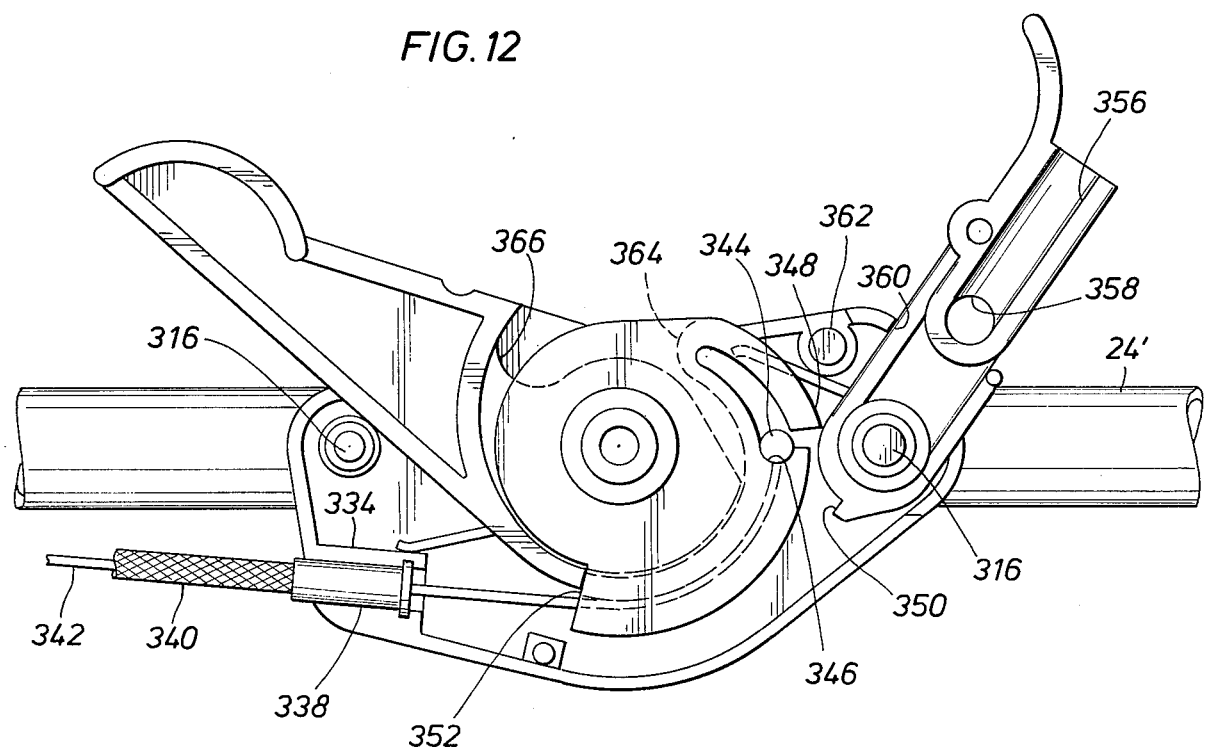
FIG. 12 is a side elevation view of the control system shown in FIG. 11 showing the control lever in its forward position and the deadman lever in relaxed position.
Figure 13:
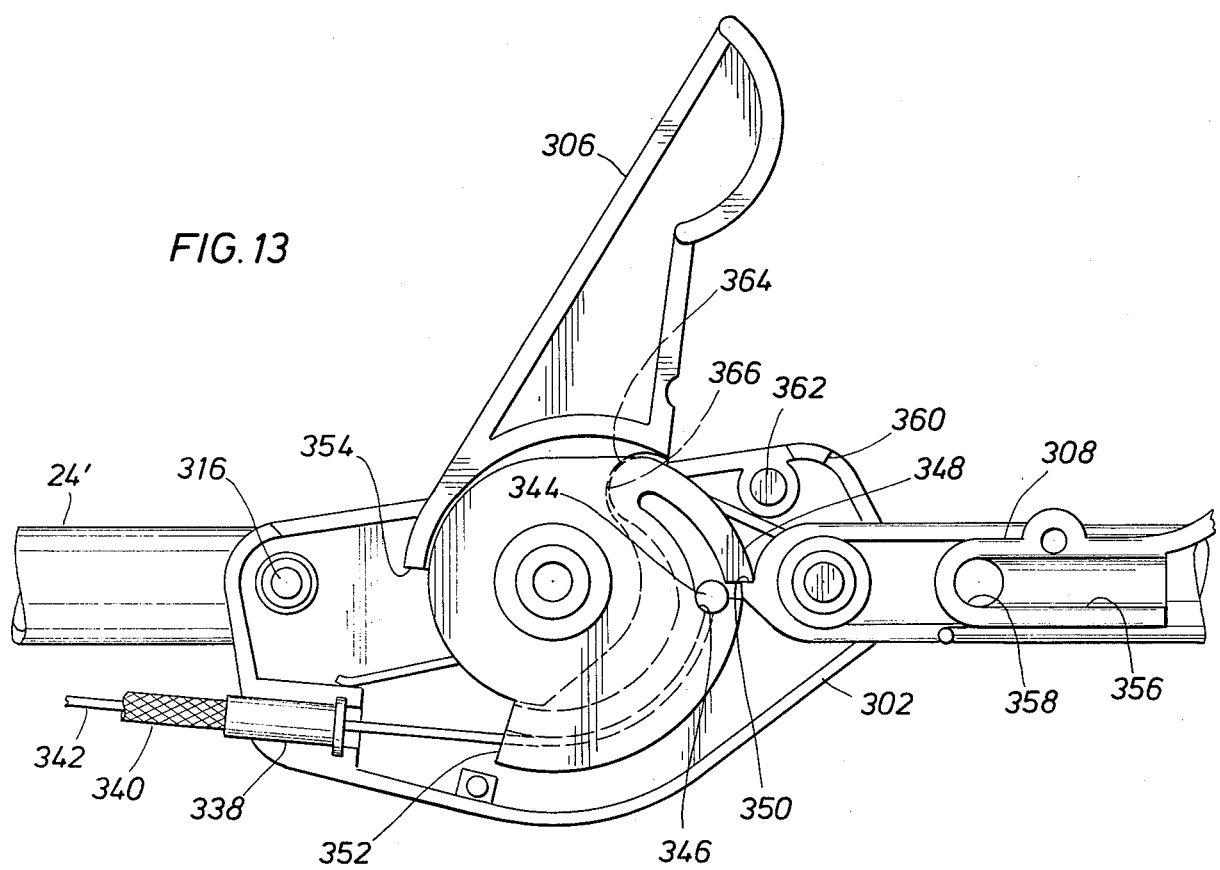
FIG. 13 is a view of the control system shown in FIGS. 11 and 12 showing the control system in operating position.

The modified control systems shown in FIGS. 11 through 17 are provided with a two-piece housing in which the control elements are mounted as hereinafter described. The assembly 300 shown in FIG. 11 is suitable to control a brake as previously described or to control a ground drive clutch.

Control system assembly 300 includes housing back 302, housing cover 304, control lever 306, deadman lever 308, cam 310 and springs 312 and 314. Suitable fastening means, such as bolts 316 (FIG. 12), extend through openings in housing cover 304 and housing back 302 and into the handle 24' to secure assembly 300 thereto. Housing back 302 includes tubular projection 318 on which lever 308 is pivotally mounted and projection 320 on which lever 306 and cam 310 are mounted. Cover 304 includes inward projection 322 which is received within the opening through the hub 324 of cam 310. Cam 310 includes tubular projection 326 which, in mounted position, extends through opening 328 in lever 306 and surrounds projection 320. Thus, cam 310 and lever 306 are pivotally mounted in housing 302, 304 as is lever 308. Spring 312 surrounds hub 330 of lever 306, has one end engaging lug 332 on lever 306, and has its other end engaging shoulder 334 on housing cover 302 to bias lever 306 in a clockwise direction as viewed in FIG. 12. Spring 314 surrounds hub 336 on lever 308, has one end engaging the interior of housing back 302 and has the other end engaging lever 308 to bias lever 308 in a counterclockwise direction as viewed in FIG. 12.

Housing back 302 and cover 304 coact to provide the recess to receive and retain ferrule 338 on control line sheath 340. Control line 342 extends through sheath 340 and is provided with Tee end 344 which engages in recess 346 in cam 310. Control line 342 is positioned between rims 346 of cam 310 so that rotation of lever 306 pulls control line 342 through sheath 340.

Cam 310 includes finger 348 which is sufficiently resilient to pass shoulder 350 on lever 308 in the counterclockwise direction with lever 308 held in running position but to engage on shoulder 350 and be supported thereby until lever 308 is released. Cam 310 also has shoulder 352 facing and adapted to engage shoulder 354 on lever 306 so that as lever 306 is advanced (counterclockwise) cam 310 is also rotated.

Figure 14:
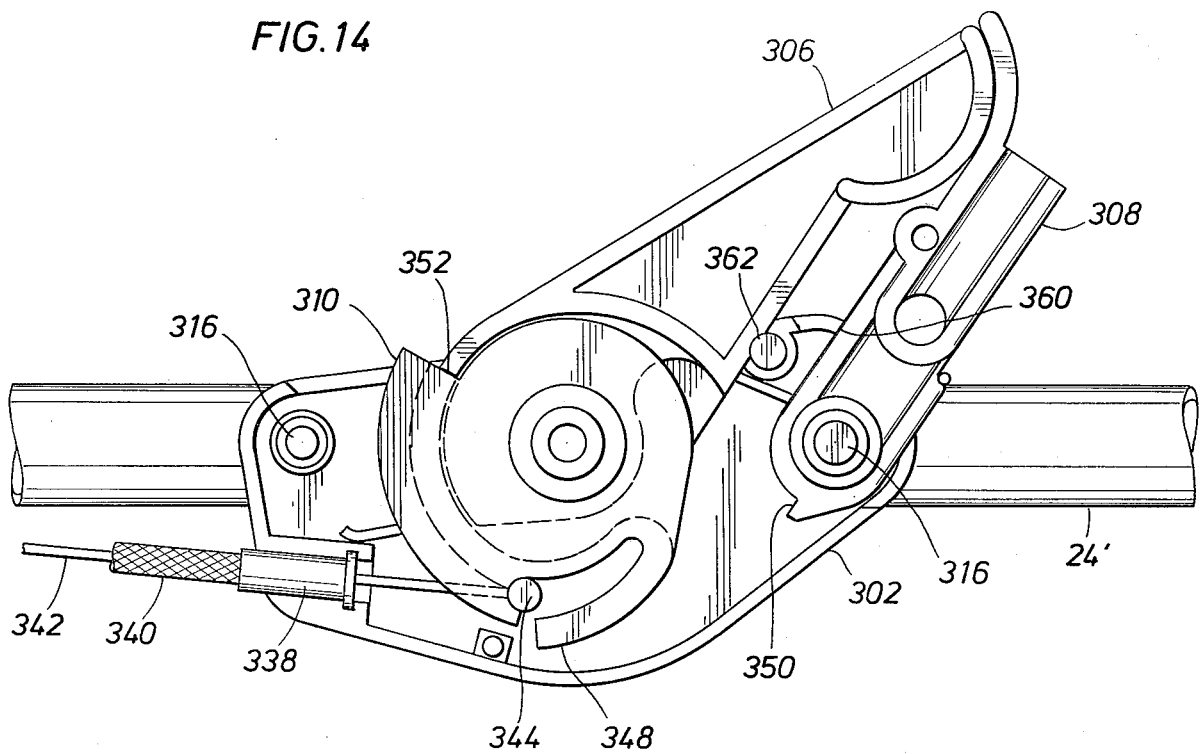
FIG. 14 is another view of the control system shown in FIGS. 11, 12 and 13 illustrating its stop position.

Lever 308 includes socket 356 and opening 358 into which a deadman bar is positioned for operation of lever 308. Lever 308 in its released position engages shoulder 360 on housing 302, 304 and lever 306 in its released position rests against stop 362 on housing back 302 as shown in FIG. 14. Lever 306 can be rotated to the position shown in FIG. 12 for actuation of control line 342. To maintain cam 310 in operating position lever 308 is moved to position shoulder 350 under finger 348. This detains cam 310 in operating position and allows lever 306 to move to the position shown in FIG. 13 where shoulder 364 on cam 310 is engaged by shoulder 366 on lever 306. In this position release of lever 308 releases lever 306 which has only a short distance to travel to its released position to thereby prevent injury resulting from full loaded travel of lever 306. The return of lever 306 to such intermediated position is independent of cam 310 which is held in operating position until deadman lever 308 is released.

In operation it is preferred that deadman lever 308 be moved to operating position and then lever 306 be moved to operating position to move finger 348 of cam 310 past shoulder 350. Release of lever 308 releases cam 310 and control cable 342 moves in sheath 340.

Figure 15:
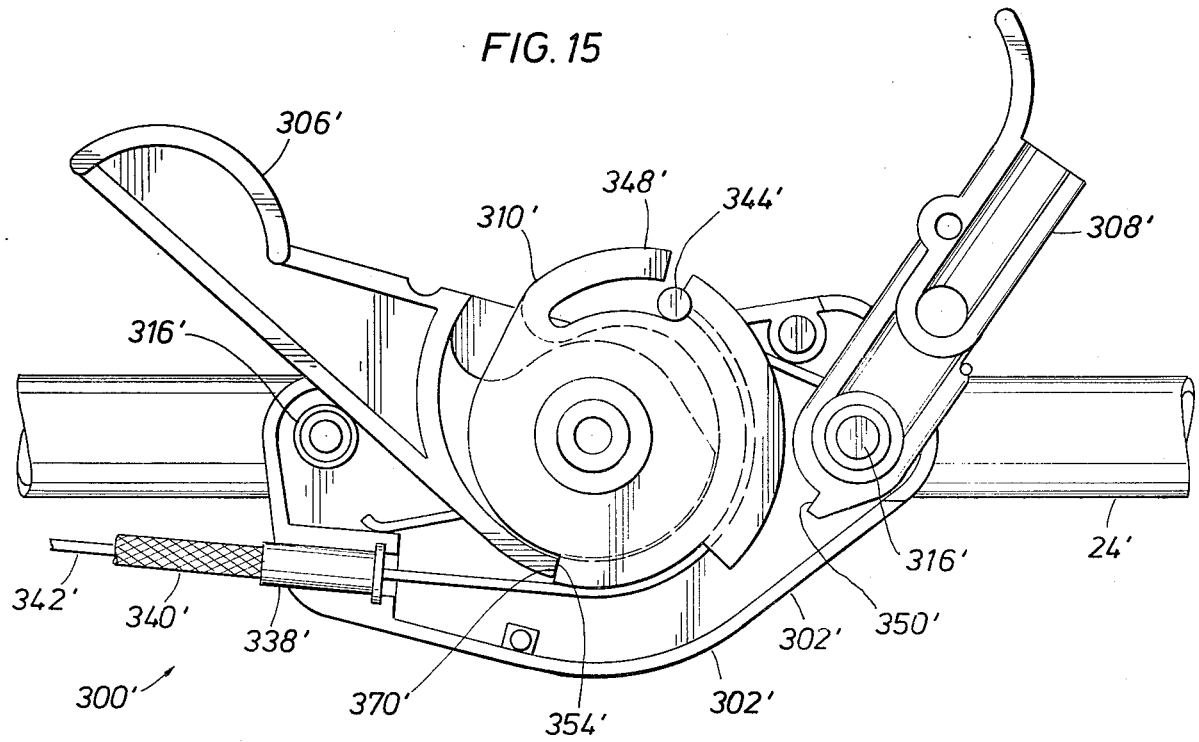
FIG. 15 is an elevation view of another modified form of control system showing the control lever in its forward position and the deadman lever in its relaxed position.
Figure 16:
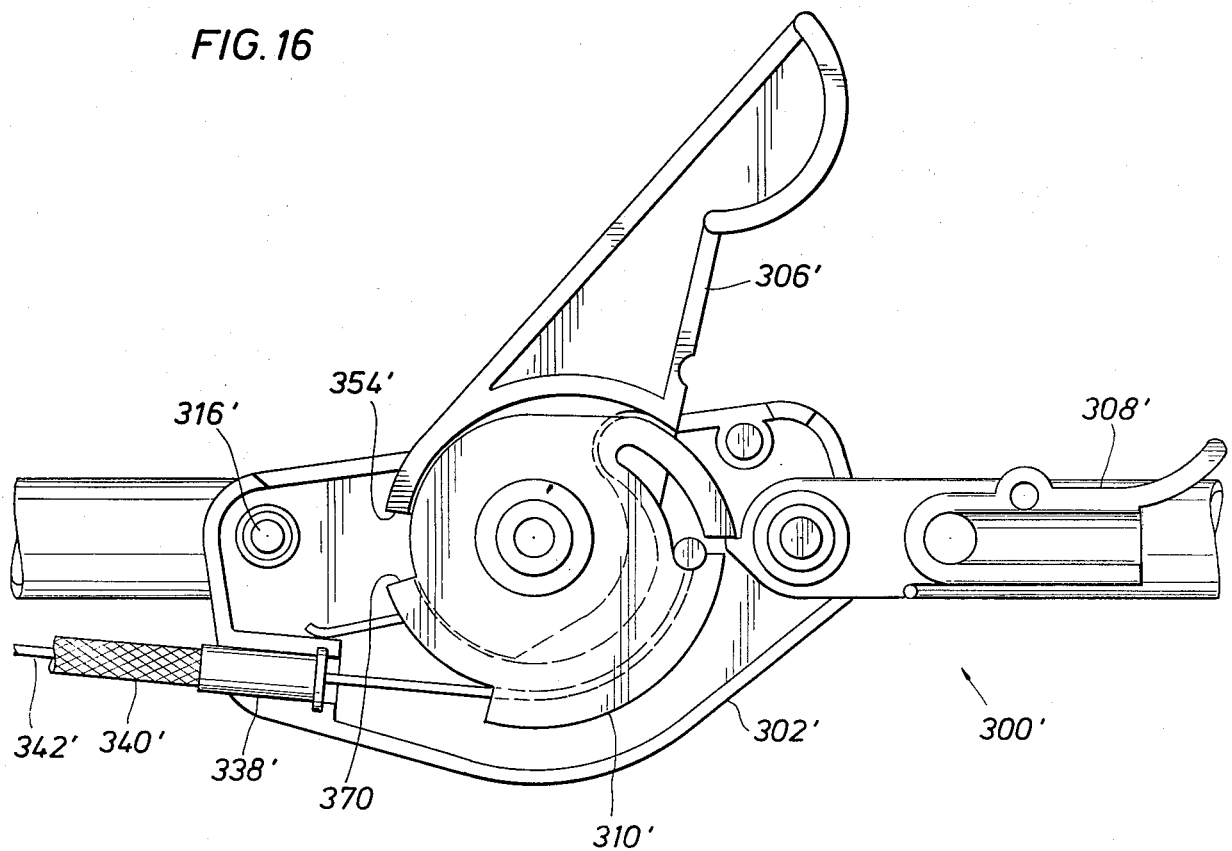
FIG. 16 is a view of the system shown in FIG. 15 illustrating the levers in operating position.
Figure 17:
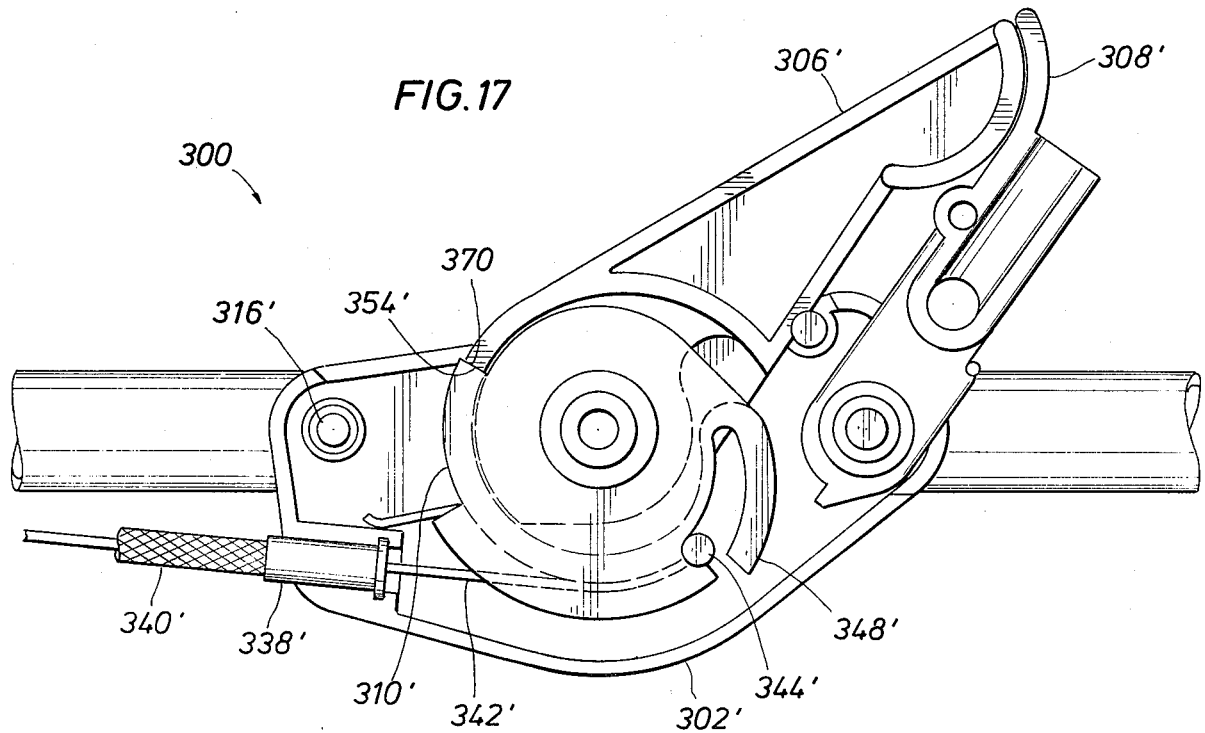
FIG. 17 is another view of the system shown in FIGS. 15 and 16 illustrating its stop position.

Another modified form of control system is shown in FIGS. 15, 16 and 17. The components thereof are substantially the same as the components of control system assembly 300 and for simplicity only the changes are hereinafter discussed. In control system assembly 300' all components which are the same as the components of assembly 300 are given the same number with a prime thereafter.

Assembly 300' is a control system which may be used to operate a remote starting system. Only cam 310' has been changed so that shoulder 354' of lever 306' engages shoulder 370 which has been advanced clockwise from the position of shoulder 352 on cam 310 so that additional rotation is provided for cam 310' and thus additional movement of control line 342' is used for the remote starting in a manner well known in the art. This additional movement can be seen by comparing the relative positions of control line tee end 344 in FIG. 12 and tee end 344' in FIG. 15.

The control systems herein described may be used to control a brake on the engine or the clutch so that the blade stops turning when the deadman lever is released or to control the ground drive clutch for a self-propelled lawn mower. Also the control systems may be used to provide remote starting with an electric starting system. The systems also allow single piece control lever or a combination control lever and cam to be used. The latter unit allows positioning of the control lever only a short distance from its stop during normal running operations.

Each form of the control system of the present invention is designed to be operated by an operator walking behind the lawn mower handle and to protect the operator if he releases his hold on the handle and control system so that the blade is stopped before the operator moves to the mower.

What is claimed is:

1. A lawn mower control system comprising
a housing,
fastening means for mounting the housing on a lawn mower handle,
a control lever pivotally mounted within the housing and extending therefrom,
a cam pivotally mounted in the housing with said control lever and having a resilient finger,
said control lever and said cam having interengaging shoulders so that movement of said control lever in one direction rotates said cam,
means on said cam for attaching a control line thereto so that rotation of said cam moves the control line, and a deadman lever pivotally mounted in said housing and having a shoulder, the shoulder on said deadman lever engaging the resilient finger on said cam to retain said cam in operating position as long as said deadman lever is held in operating position.

2. A control system according to claim 1 wherein the control line is connected to operate a brake.

3. A control system according to claim 1 wherein the control line is connected to operate a ground drive clutch.

4. A control system according to claim 1 wherein the control line is connected to operate an electric starting system.

5. A lawn mower control system comprising a control lever having a relaxed position and a running position, a second lever, means for pivotally mounting said levers to a mower handle whereby said second lever, when retained in running position by the operator, engages and retains said control lever in running position and release of the second lever releases said control lever to return to relaxed position, a control cable connected to said control lever, a shoulder on said control lever, said second lever engaging said shoulder to retain said control lever in running position, a pair of engine start contacts, and a pair of engine stop contacts, said control cable connects to a brake and to an arm which is positioned between said start and stop contacts, and is moved against said stop contacts and against said start contacts by movement of said control cable.

6. A control system according to claim 5 wherein movement of said control cable to move said arm into engagement with said stop contacts also engages said brake.

7. A lawn mower control system comprising a control lever having a relaxed position and a running position, a second lever, means for pivotally mounting said levers to a mower handle whereby said second lever, when retained in running position by the operator, engages and retains said control lever in running position and release of the second lever releases said control lever to return to relaxed position, a control cable connected to said control lever, a shoulder on said control lever, said second lever engaging said shoulder to retain said control lever in running position, and means coacting between said second lever and said control lever to avoid inadvertent movement of said control lever to its running position.

8. A control system according to claim 7 wherein said coacting means includes a second shoulder on said control lever, said second lever engaging said second shoulder in relaxed position of said control lever of said second lever to prevent inadvertent movement of said control lever to its running position.

9. A control system according to claim 7 wherein said coacting means includes an arcuate protecting plate on said second lever providing a recess, and a handle on said control lever, said handle being positioned in said plate recess to avoid its inadvertent movement from its relaxed position prior to movement of said second lever from its relaxed position.

10. A lawn mower control system comprising a control lever having a relaxed position and a running position, a second lever, means for pivotally mounting said levers to a mower handle whereby said second lever, when retained in running position by the operator, engages and retains said control lever in running position and release of the second lever releases said control lever to return to relaxed position, a control cable connected to said control lever, a shoulder on said control lever, said second lever engaging said shoulder to retain said control lever in running position, a slot and a recess in said control lever, and a pin on the end of said control cable, said pin being positioned in said slot and against said recess when said control lever is moved to running position, said slot receiving said pin when said control lever is moved to relaxed position and the movement of said recess is more than the cable movement between its relaxed and running positions.

11. A lawn mower control system comprising a control lever having a relaxed position and a running position, a second lever, means for pivotally mounting said levers to a mower handle whereby said second lever, when retained in running position by the operator, engages and retains said control lever in running position and release of the second lever releases said control lever to return to relaxed position, a control cable connected to said control lever, a shoulder on said control lever, a link pivotally mounted with said levers and having a pin extending through its free end to engage said shoulder when said control lever is in running position, means biasing said link toward engagement with said control lever, and means on said second lever for engaging said link to move said link out of engagement with said control lever when said second lever is released.

12. A lawn mower comprising a housing having a handle, wheels, an engine, a cutting blade, a clutch connecting the blade to the engine, and a brake positioned to stop blade rotation, a control lever, a control cable connecting said control lever to said brake and said clutch, a second lever, means for pivotally mounting said levers to said mower handle wherein said second lever, when retained in running position by the operator, engages and retains said control lever in running position and release of said second lever releases said control lever to return to relaxed position, and means coacting between said control lever and said second lever to avoid inadvertent movement of said control lever from its relaxed position.

13. A lawn mower according to claim 12 wherein said coacting means includes an arcuate protecting plate on said second lever providing a recess, and a handle on said control lever, said handle being positioned in said plate recess to avoid its inadvertent movement from its relaxed position prior to movement of said second lever from its relaxed position.

14. A lawn mower comprising a housing having a handle, wheels, an engine, a cutting blade, a clutch connecting the blade to the engine, and a brake positioned to stop blade rotation, a control lever, a control cable connecting said control lever to said brake and said clutch, a second lever, means pivotally mounting the levers to said mower handle wherein said second lever, when retained in running position by the operator, engages and retains said control lever in running position and release of said second lever releases said control lever to return to relaxed position, a control cable connected to the control lever, a shoulder on the control lever, said second lever engaging said shoulder to retain said control lever in running position, a pair of engine start contacts, and a pair of engine stop contacts, said control cable connected to a brake and to an arm which is positioned between said start and stop contacts and is moved against said stop contacts and against said start contacts by movement of said control cable.

15. A lawn mower comprising a housing having a handle, wheels, an engine, a cutting blade, a clutch connecting the blade to the engine, and a brake positioned to stop blade rotation, a control lever, a control cable connecting said control lever to said brake and said clutch, a second lever, means pivotally mounting the levers to said mower handle wherein said second lever, when retained in running position by the operator, engages and retains said control lever in running position and release of said second lever releases said control lever to return to relaxed position, means coacting between said control lever and said second lever to avoid inadvertent movement of said control lever from its relaxed position, said coacting means includes a second shoulder on said control lever, said second lever engaging said second shoulder in relaxed position of said control lever and said second lever to prevent inadvertent movement of the control lever to its running position.

16. A lawn mower control system comprising a control lever having a relaxed position and a running position, a second lever, means for pivotally mounting said levers to a mower handle whereby said second lever, when retained in running position by the operator, engages and retains said control lever in running position and release of the second lever releases said control lever to return to relaxed position, a cam pivotally mounted with said control lever and having stop means thereon, and a shoulder on said second lever for engaging said stop means when both said lever are in operation to retain said cam in operating position.

17. A lawn mower comprising a housing having a handle, wheels, an engine, a cutting blade, a clutch connecting the blade to the engine, and a brake positioned to stop blade rotation, a control lever, a control cable connecting said control lever to said brake and said clutch, a second lever, means pivotally mounting the levers to said mower handle wherein said second lever, when retained in running position by the operator, engages and retains said control lever in running position and release of said second lever releases said control lever to return to relaxed position, a cam pivotally mounted with said control lever and having stop means thereof, and a shoulder on said second lever for engaging said stop means when both said lever are in operation to retain said cam in operating position.

* * * * *